United States Patent [19]

Wiener

[11] Patent Number: 5,524,679
[45] Date of Patent: Jun. 11, 1996

[54] SMART SKIN ARRAY WOVEN FIBER OPTIC RIBBON AND ARRAYS AND PACKAGING THEREOF

[75] Inventor: Patricia Wiener, La Honda, Calif.

[73] Assignee: Page Automated Telecommunications Systems, Inc., Sunnyvale, Calif.

[21] Appl. No.: 191,373

[22] Filed: Feb. 1, 1994

Related U.S. Application Data

[60] Continuation-in-part of Ser. No. 998,234, Dec. 30, 1992, abandoned, which is a division of Ser. No. 671,582, Mar. 19, 1991, Pat. No. 5,256,468.

[51] Int. Cl.$^6$ ........................................... D03P 15/00
[52] U.S. Cl. ................. 139/420 R; 139/383 R; 428/228
[58] Field of Search ................. 139/383 R, 97, 139/11, 420, 420 R, 425 R, 424; 156/435; 264/104, 241; 428/255, 228; 362/32

[56] References Cited

U.S. PATENT DOCUMENTS

| | | | |
|---|---|---|---|
| 3,909,508 | 9/1975 | Ross | 139/425 R |
| 4,567,094 | 1/1986 | Leoin | 439/420 |
| 4,885,663 | 12/1989 | Parker | 362/32 |

Primary Examiner—C. D. Crowder
Assistant Examiner—Larry D. Worrell, Jr.
Attorney, Agent, or Firm—Townsend and Townsend and Crew

[57] ABSTRACT

A woven structure is described in which optical fibers are positioned and held in the structure in a manner to maximize their optical efficiency. The structure consists of non-optical fibers extending in both the warp and woof direction, the optical fibers are positioned in channels between supporting fibers in the warp direction. Selected ones of the non-optical fibers in the warp direction may be electrical conductors. The structure is manufactured using conventional weaving equipment by positioning both the optical fibers and the non-optical warp fibers, and then weaving the woof fibers into place without causing micro-bends or discontinuities in the optical fibers. The structure is woven with the optical fibers positioned in zero warp. The woven grid-like mat can be coated with a protective material that either enables it to form a flexible sheet or a rigid, hard, grid-like mat which has aligned zero warp optical fibers embedded therein. The structure shown can be used to provide sensing, imaging or communications. It can be utilized for optical backplanes for opto-electronic systems or a housing for opto-electronic components. Several types of interconnects or connectors can be fabricated according to the present invention capable of interfacing with the woven structure in an array-based, optical or opto-electronic, active or passive interconnect/connector scenario. The invention may also be used in highly parallel, high performance computer systems and sensing systems.

32 Claims, 10 Drawing Sheets

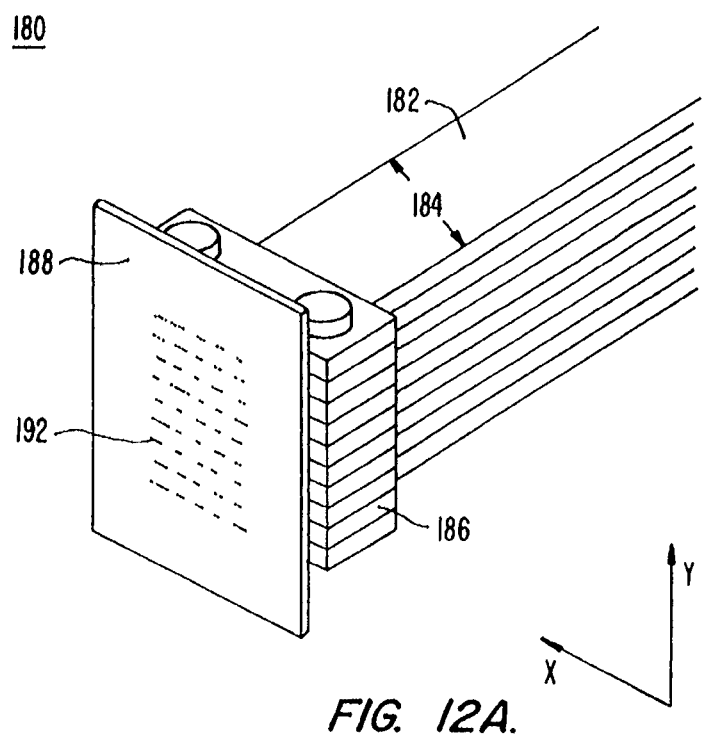
FIG. 12A.
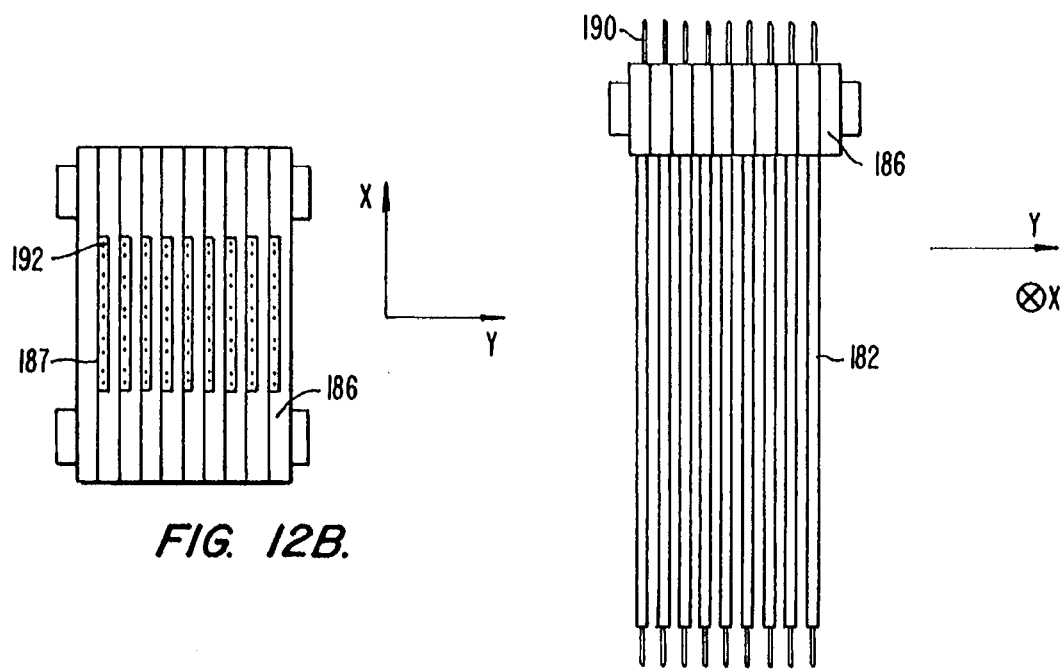
FIG. 12B.
FIG. 12C.

SMART SKIN ARRAY WOVEN FIBER OPTIC RIBBON AND ARRAYS AND PACKAGING THEREOF

CROSS REFERENCE TO RELATED APPLICATION

This application is a continuation-in-part of commonly assigned, U.S. patent application Ser. No. 07/998,234, filed Dec. 30, 1992, now abandoned, which is a divisional application of U.S. Pat. application Ser. No. 07/671,582, filed on Mar. 19, 1991, now U.S. Pat. No. 5,256,468, issued Oct. 26, 1993.

BACKGROUND OF THE INVENTION

This invention relates to optical systems and optical fibers, and particularly to optical fibers woven into other material to provide sensors or "smart" skins for aircraft and other applications such as optical backplanes for highly parallel, high performance computer systems, and local area network interconnects.

Fiber optic technology has become increasingly desirable for numerous aircraft and spacecraft applications, and for data transmission in highly parallel, high performance computer systems, as well as local area network interconnects. The size, weight, communications density, immunity to interference, and ruggedness, are pushing fiber optic technology into more and more applications where it provides greater speed capabilities and integrity of communication links.

A recent concept in the manufacture of aircraft and spacecraft has been the employment of fiber optics within the skin of the craft itself, thereby creating a "smart" skin which enables sensors embedded into the composite material to convey information about the aircraft or spacecraft throughout the craft without need for separate communications links and their associated disadvantages.

The mechanical properties of material woven from glass fibers are reasonably well known. Such material provides desirable mechanical properties including high tensile strength, flexibility, resistance to weather as well as chemicals, high tear strength, dimensional stability, and abrasion resistance.

It is also known that individual optical fibers can be used to transmit optical signals throughout the length of the fiber and have very high bandwidths. Individual optical fibers have excellent optical properties, but are very fragile. A variety of techniques have been developed to hold individual fibers in a manner to prevent damage to them. For example, they are frequently encased in cables or other protective material. In addition, individual fibers can be grouped together to provide cables capable of carrying increased amounts of information.

One technique widely used for protection of optical fibers is to encapsulate them in an epoxy material to provide rigidity and strength. For example, U.S. Pat. No. 4,547,040 describes an optical fiber assembly where optical fibers are held in an embedding material.

Individual optical fibers have also been woven into sheets. For example, U.S. Pat. No. 4,907,132 describes a device where optical fibers are woven into a panel. The fibers are positioned in the warp direction of the weave. Where the fibers cross the woof fibers, the coating is removed so that the fibers emit light. In this manner, a panel made from the fibers emits light. U.S. Pat. No. 4,885,663 shows woven optical fibers where the bends in the fibers where they cross the woof provide discontinuities for the emission of light. The purpose of this structure is provide a light-emitting panel.

Other references such as U.S. Pat. Nos. 4,952,020 and 4,468,089 show optical fibers which are encapsulated in various ways to form cable assemblies such as described above. Unfortunately, the cable assemblies described in these patents are relatively expensive and cannot be used to form sheet-like structures.

Many papers have been written on the application of optical fibers to the formation of "smart" skins for aircraft or spacecraft. In "Fiber Optic Skin and Structural Sensors," by Eric Udd, *Industrial Metrology* 1 (1990) 3–18, the use of optical fibers in a skin-like material for use as sensors is described. The paper, however, describes the fibers as being merely embedded in a structural material. Embedding the fibers in that manner suffers from the disadvantages discussed in the paper discussed below.

In a paper entitled, "Smart Skins and Fiber-optic Sensors Application and Issues," Kausar Talat, Boeing Defense & Space Group, Seattle, Wash. (unpublished), describes material with embedded optical fibers where the physical properties of the fiber itself were used as a sensor. The composite described in this article includes optical fibers disposed inside a laminated structure. At the end of the structure, the optical fibers pass through a tube inserted to prevent microbending of the fiber where it exists from between the laminated sheets. As described in the article, the laminated structure causes the fibers to kink during curing, creating losses as well as having other disadvantages discussed in the paper.

SUMMARY OF THE INVENTION

The present invention provides a structure which solves many of the problems described above. According to the invention, the optical fibers are woven into a supporting structure in channels therein. The optical fibers are positioned in zero warp and supported in the channels without cross-overs or micro-bends. The term "zero warp", also known as "zero degree warp", refers to the manner in which warp threads are positioned in, for example, a conventional plain weaving process. In such a process, two sets of fibers are interlaced perpendicular to each other. One set of fibers, the zero degree warp or zero warp fibers, are positioned straight and parallel in a direction perpendicular to the heddle. The other set of fibers, the woof fibers, are interlaced with the warp fibers at a ninety degree angle to the warp fibers.

According to the present invention, optical fibers are positioned and held in a grid-like mat woven from fibers of a supporting material. This supporting material can consist of any desired material providing the requisite properties, for example, fiberglass, graphite, etc. The supporting fibers are used for both the warp and woof fibers for the structure. During manufacture, one or more optical fibers are positioned in channels between the supporting fibers in the warp direction. Each channel can have a large number of optical fibers.

As mentioned above, the structure is woven with the optical fibers positioned in zero warp. This enables the optical fibers to be supported in the woven structure, and thereby to operate with maximum transmission efficiency. Once complete, the woven grid-like mat can be coated with various types of protective material such as an elastomer or a rubber epoxy to form a flexible sheet with the optical fibers embedded within it. Alternatively, the structure can be coated or embedded in a rigid material, such as epoxy, to form a hard or rigid grid-like structure.

One advantage of the invention is that the weaving process and the resultant support structure minimize the risk of micro-bends in the optical fibers embedded in the woven structure. Micro-bends can cause losses in optical fibers. Light transmission in optical fibers is greatly degraded by micro-bends and other discontinuities in the fibers which cause modal spreading and light emission, i.e., the fibers glow instead of transmitting light from one end to the other. When micro-bends and discontinuities are eliminated, the longitudinal transmission of light is maximized, thus greatly enhancing optical signal processing capabilities. In order to form a micro-bend, an optical fiber must be bent with a sharp bend radius smaller than the rated bend radius of the optical fiber as specified by the manufacturer, and then held in place. If the fiber is not held in place it will straighten itself out. If the bend radius is too sharp, the optical fiber will break. Micro-bends are not formed simply by bending optical fibers. In fact, optical fibers are commonly stored in coils. It is only when the bends are sharper than the rated bend radius that micro-bends and/or discontinuities result. The present invention provides a method and structure in which the risk of such stress on the optical fibers is minimized.

The structure fabricated according to this invention has many applications and can be used to provide sensing, imaging, and communications. For example, the structure is suitable for communication of sensing information on the surface of an aircraft or spacecraft. Additionally, the structure may be employed for transmission of data in highly parallel, high performance computer systems, and local area network interconnects.

In a specific embodiment of the invention, the woven structure includes a plurality of first strands positioned in a warp direction and a plurality of second strands positioned in a woof direction, the second strands being woven with the first strands. A plurality of optical fibers are positioned in zero warp in channels in the structure, the channels being defined by selected ones of the first strands. The second strands are interlaced with the first strands, but not with the optical fibers. In one embodiment, selected strands of the plurality of first strands are electrical conductors. In a more specific embodiment, the electrical conductors are positioned in zero warp in the channels formed by selected first strands.

In one embodiment, the electrical conductors and optical fibers are coated with an elastomer. In a more specific embodiment, the thickness of the elastomer is varied to control the bend radius of the optical fibers, thereby facilitating interconnect capability in a direction out of the plane formed by the woven structure.

In a specific embodiment, the woven structure further comprises a connector having openings for accommodating the optical fibers. In another embodiment, the structure further comprises a connector having electrical contacts coupled to the electrical conductors. In further embodiments, both of the above-described connectors include a chamfer structure for controlling the actual bend radius of the optical fibers to be greater than the rated bend radius. The rated bend radius of an optical fiber, as specified by the manufacturer, is the bend radius below which light scattering occurs and operation of the fiber becomes unreliable. Alternatively, the connectors may employ a rod for controlling the actual bend radius of the optical fibers to be greater than the rated bend radius. The optical fibers and electrical conductors of either of these embodiments may further be coated with an elastomer having varying thickness, thereby providing further control of the actual bend radius.

In a different embodiment, the woven structure further comprises a connector having openings for accommodating the optical fibers, electrical contacts coupled to the electrical conductors, and a plurality of opto-electronic devices coupled to the electrical contacts and optical fibers to facilitate signal translation from electronic to optical and from optical to electronic. The connector may include the bend control structures described above. Thus, the structure of the invention may include passive connectors in which no signal translation takes place, and active connectors in which signal translation occurs.

A further understanding of the nature and advantages of the present invention may be realized by reference to the remaining portions of the specification and the drawings.

BRIEF DESCRIPTION OF THE DRAWINGS

FIGS. 12A–12C illustrate various views of one embodiment of an X-Y array interconnect designed according to the invention.

DESCRIPTION OF THE SPECIFIC EMBODIMENTS

Figure 1:
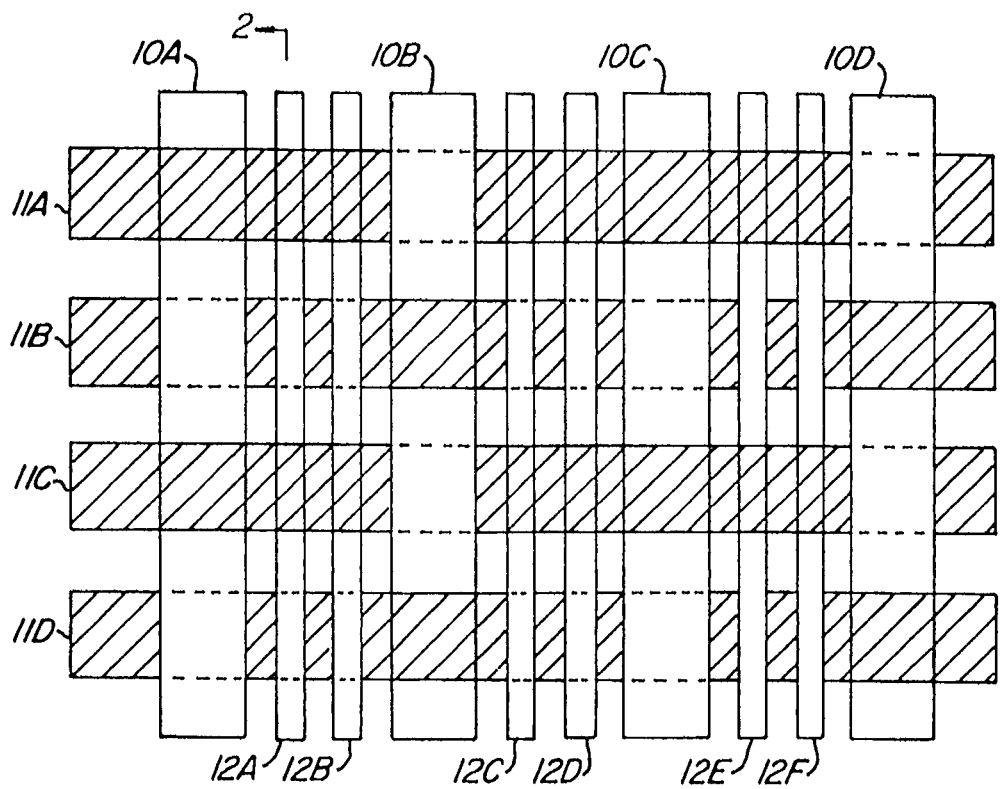
FIG. 1 is a plane view of a structure having both woven support fibers and optical fibers.

FIG. 1 is a plane view of a specific embodiment of a structure fabricated according to the invention. As illustrated, the structure is woven with warp strands 10A, 10B, 10C, 10D, and woof (or pick) strands 11A, 11B, 11C and 11D. The warp and woof strands are woven together into a fabric-like structure using a normal over-and-under plain weave pattern. Any desired material having the physical properties desired for the application may be employed as the warp and woof strands. For example, the strands may comprise fiberglass, graphite, silica carbide, or other materials. An example of a silica carbide fiber suitable for some applications is sold by Dow-Corning Corporation under the trademark Nicalon™.

Introduced with the supporting warp fibers before the weaving are optical fibers 12A, 12B, 12C, 12D, 12E and 12F. Importantly, the optical fibers are introduced into the structure to run in the warp direction being held in zero warp. That is, the optical fibers are held straight and parallel in the warp direction. The effect of the structure in which the optical fibers are supported is the absence of micro-bends or crimps in the optical fibers, thereby providing maximum optical efficiency and repeatability of signals regardless of their transmission position within the woven structure. It is well known that when signals are transmitted through optical fibers, losses occur wherever bending or kinking of the fiber is present. The structure shown in FIG. 1 includes a pair of optical fibers in the channels formed by non-optical warp strand 10A, ... 10D. Of course, more or fewer optical fibers may be employed.

Figure 2:
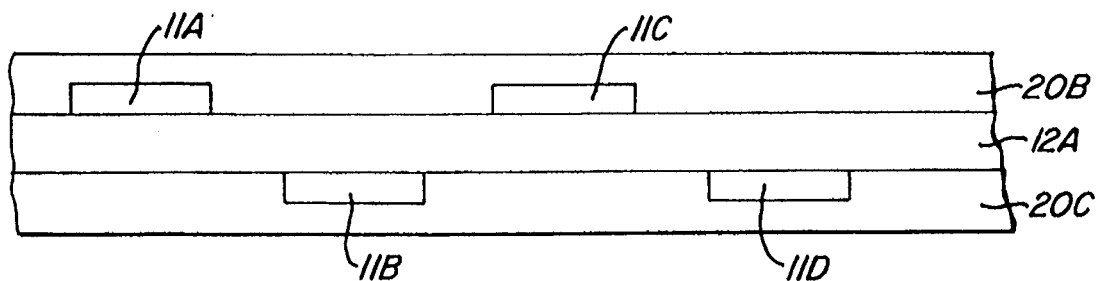
FIG. 2 is a cross-sectional view of the structure of the invention shown in FIG. 1.

FIG. 2 is a cross-sectional view of a structure such as depicted in FIG. 1, but which has also been coated with a protective coating material to hold all fibers in place. FIG. 2 can be considered to be a cross-sectional view of the structure shown in FIG. 1 taken along the length of fiber 12A. As shown in FIG. 2, the optical fiber 12A extends across the figure with woof strands 11A, 11B, 11C and 11D, and thus is under the optical fibers in one plane and over the optical fibers in another plane. A coating 20 consisting of a well known material such as an elastomer, a rubber epoxy, or other suitable material, holds the optical fibers in position with respect to the surrounding structure. Additionally, coating 20 prevents moisture from entering or exiting the structure, and may be employed to control the bend radius of the optical fibers.

Figure 3:
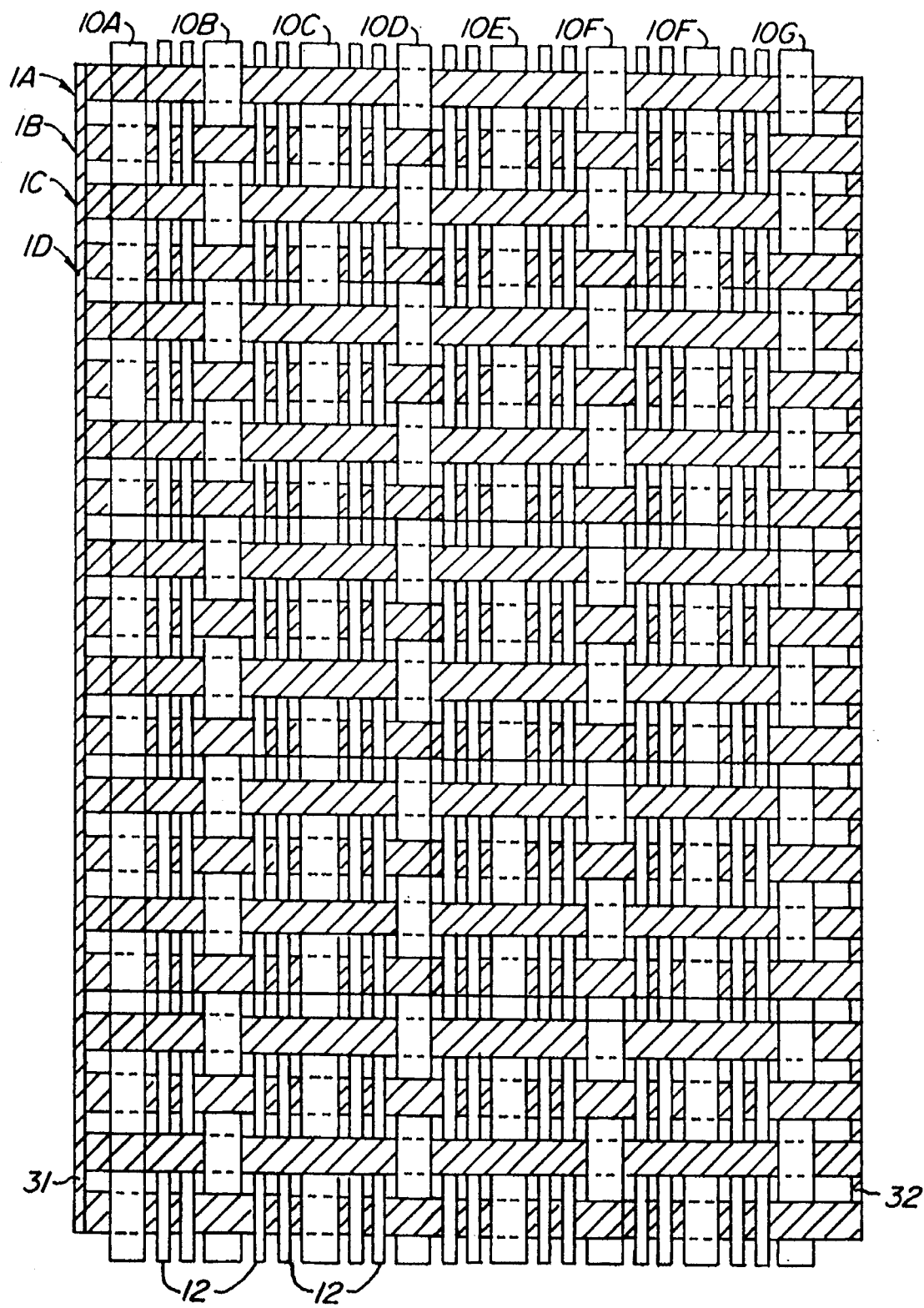
FIG. 3 illustrates a larger section of a woven structure and termination of two edges of the structure.

FIG. 3 depicts a larger region of a structure woven according to a specific embodiment to illustrate the manner in which the woof strands are bound at the edges of the structure. As shown in FIG. 3, the optical fibers 12 extend from the top of the figure to the bottom, while the woof strands extend across the figure from left to right. Also extending from the top of the figure to the bottom are the warp strands discussed above in conjunction with FIG. 1. The edges of the woof strands 11 may be bound by a conventional technique using leno material 31 and 32. Of course, other techniques may also be employed to secure the edges of the fabric, for example by knotting them together, or simply by coating the structure before further processing.

For the embodiment depicted in FIG. 3, silica carbide fibers such as those described above are employed which have a dimension of 1800 denier and are woven with a density of 44 optical fibers per inch. The density of the weave is defined both by the diameter of the optical fiber, the surrounding structure and the width of the teeth of the comb, and is variable as necessary depending upon the application.

The optical fibers embodied in the fabric depicted in FIG. 3 are commercially-available optical fibers such as graded index GE-doped silica fibers manufactured by Corning or single mode silica fibers, etc. In one embodiment Corning fibers with a numerical aperture of 0.22, a core of 125 microns, an overall diameter of 250 microns, and an 85° C. temperature rating are employed. Using fibers such as these in a structure as described results in about 44 fibers per lineal inch across the structure. The length of the structure is dependent on the length of the roll of material used, and very long structures, exceeding a kilometer in length, can be fabricated using existing commercially-available weaving equipment with adequate tension control methods applied. The optical fibers can be positioned, and the surrounding structure woven, using conventional textile weaving equipment. For example, a composite generation facility with standard weaving equipment can be employed. A comb is employed as part of the standard weaving equipment to position the optical fibers. The comb can be in the form of a small-toothed comb installed at the front end of the weaving equipment. Such a comb provides a reproducible number of fiber optic strands between the strands of the intervening material and assures a non-overlapping condition with unbent optical fibers. Although various commercial machines will require different adjustments, during one test of the weaving operation, a change in tension occurred when the weaving spinner rollers ran out of fiber. This change in tension can cause breakage of the optical fiber, and accordingly the importance of controlling proper tension by suitable monitoring and maintenance of full rollers is believed to be important. It should be noted that, for optimum results and to avoid damage to the optical fibers, the number of pics per inch (woof strands per inch), and the operational speed of the weaving machine should be tailored to suit the types of fiber optic and non-fiber optic material used.

In the past, optical fibers were laid out manually in composite plies in specific orientation. Misalignment of the optical fiber orientation results in significant losses. In the techniques described herein, the laying out of the fiber is achieved automatically in the normal weaving process. Reducing such losses provides for a uniformity and repeatability that lends itself to accurate and diverse modality sensing, efficient data transmission, and simple interconnect processes. Two important issues are sensor network integration within the structure and high speed operation in computer systems. This invention successfully addresses these issue as it relates to major systems.

For the embodiment depicted in FIG. 3, two optical fiber yarns are placed in the channel between each of the warp strands. It should be understood, however, that any desired number of optical fibers can be placed between each of the warp strands. For example, in one embodiment each channel contains eight optical fibers. Other embodiments are discussed below.

Once the structure has been woven with the optical fibers in position, the assembly may be coated with a desired material to give added protection to the structure. As described in conjunction with FIG. 2, by applying a coating to the woven grid-like mat, the position of the fibers in the plane of the grid-like mat is fixed, and the structure is provided with additional rigidity. Preferably, the curing material can be applied by brushing it onto the woven sheet, by passing the woven sheet through a bath of curing material, or by employing other conventional application techniques.

In one embodiment of the invention, the rigid coating was made using a curing fluid made from the EPON 828 epoxy, manufactured by Shell Chemical Company, mixed with a fixing agent of diethylene-triamine in a ratio of 88% epoxy and 12% fixing agent by volume. In other embodiments where a flexible structure is desired, commercial grade rubber cement has been employed.

Figure 4:
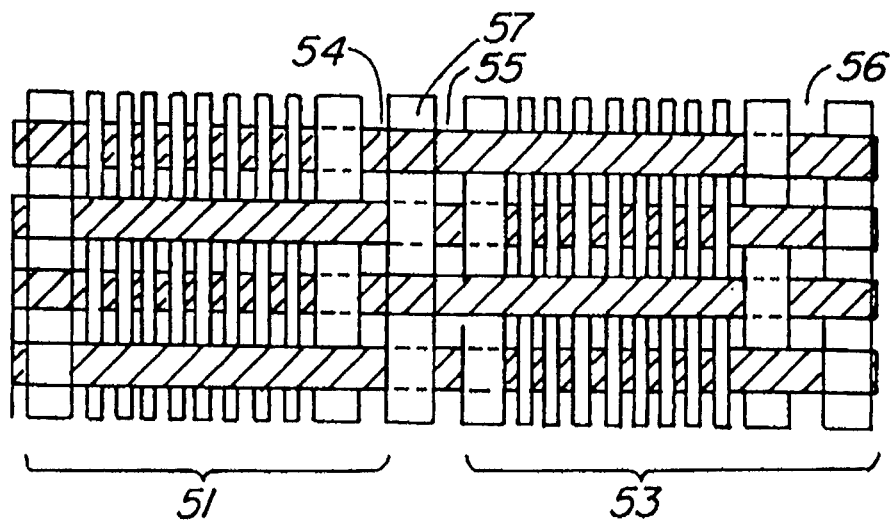
FIG. 4 illustrates another embodiment of the invention in which a parallel weave of separable optical fiber ribbons of one type are woven with other material and can be separated into individual ribbons.

FIG. 4 illustrates another embodiment of the structure of the invention as ribbons. As shown, the structure is divided into two sections, 51 and 53. These sections are separated by additional longitudinal leno filaments 54 and 55, and an extra support fiber 57. The leno filaments 54 and 55 provide a convenient place where the optic grid can be separated into individual ribbons, provide a convenient marker for identifying particular fibers, and prevent the structure from unraveling. Of course, any desired number of sections can be used in the structure. In this manner, a large loom can be used to weave in parallel widths of like or varied materials later divided into sections for various uses.

Figure 5:
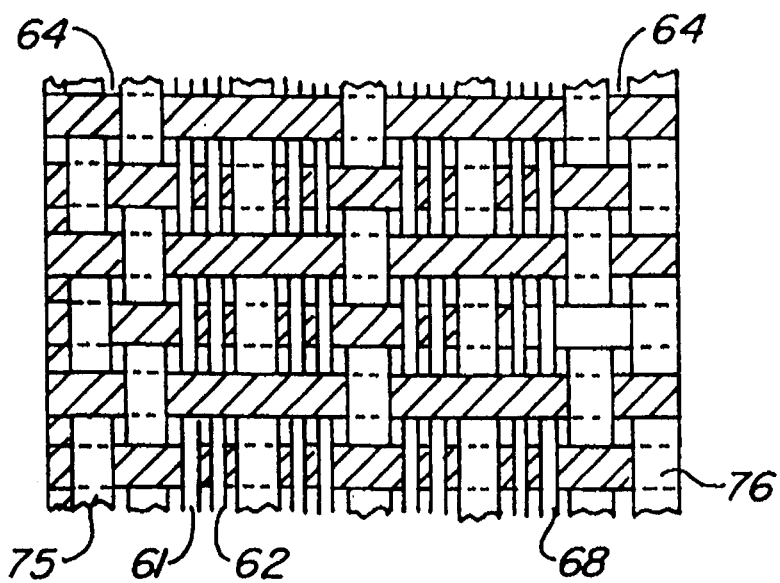
FIG. 5 illustrates another embodiment of the invention showing fiber optic ribbons having a plurality of two fiber optic strands per ribbon.

FIG. 5 depicts another embodiment of the invention in which eight optical fibers 61, 62, . . . 68 are positioned in pairs between two support fibers. Lenos 64 with associated extra support fibers 75 and 76 are provided to enable one strip of the structure to be fabricated with a number of sections and then divided into separate pieces if desired.

Figure 6:
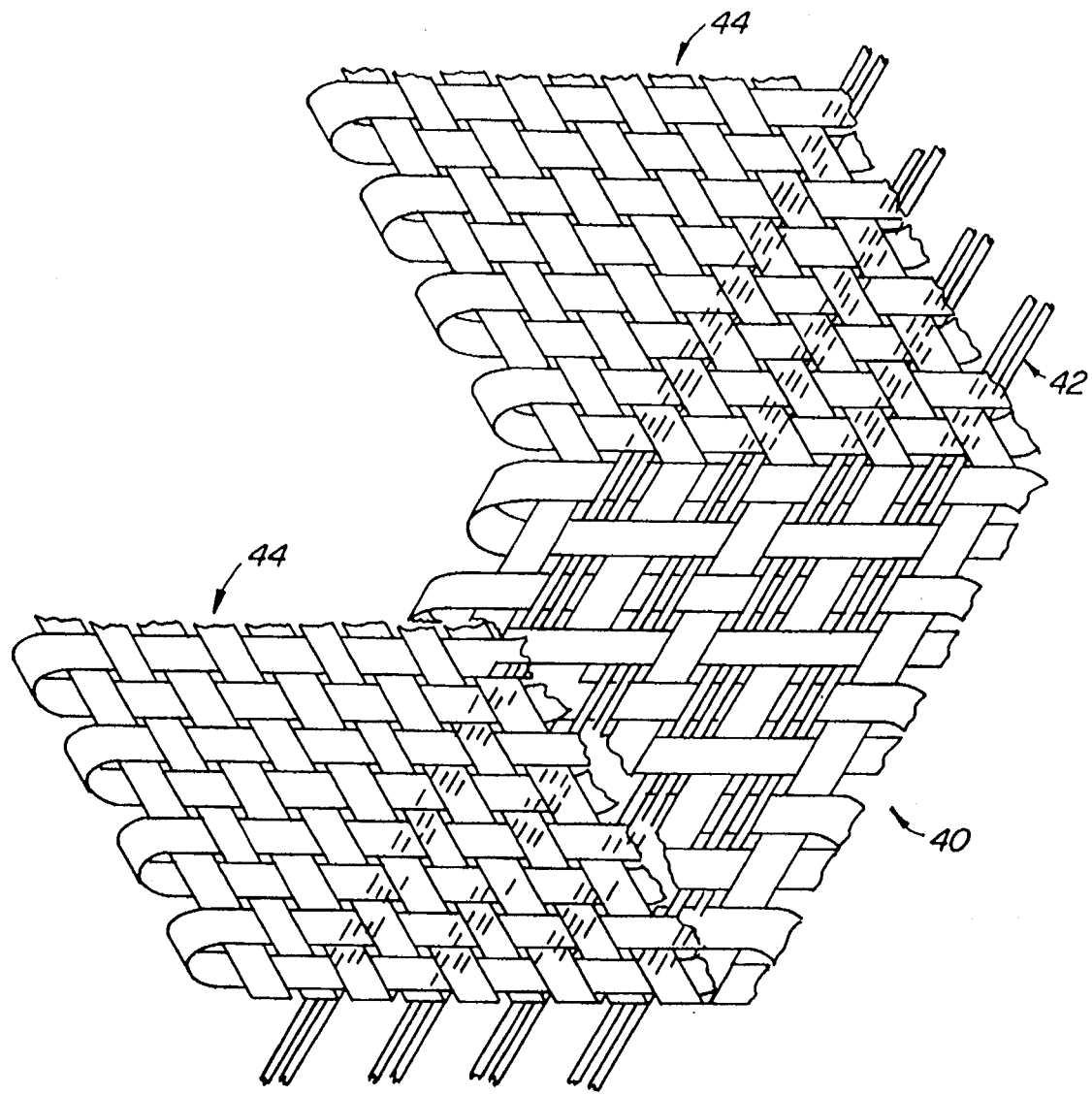
FIG. 6 illustrates a three-dimensional packaging structure.

FIG. 6 illustrates a three-dimensional woven structure suitable for various packaging considerations. As shown, the structure includes a woven backplane 40 with fiber optic conductors 42 and two woven planes 44 substantially perpendicular to the backplane. This structure can be used as a printed circuit board, or to support printed circuit boards and/or wafers which interface to the fiber optics in the backplane. This section could be at various angles relative to the backplane. It is suggested that sharp angles be avoided. All sections moving out of the plane should be rounded at an angle no less than the rated bend radius of the optical fibers as recommended by the manufacturer. This avoids undue stress at sharp edges of the supporting structure. Coatings applied to the structure can supply additional stress relief.

Figure 7:
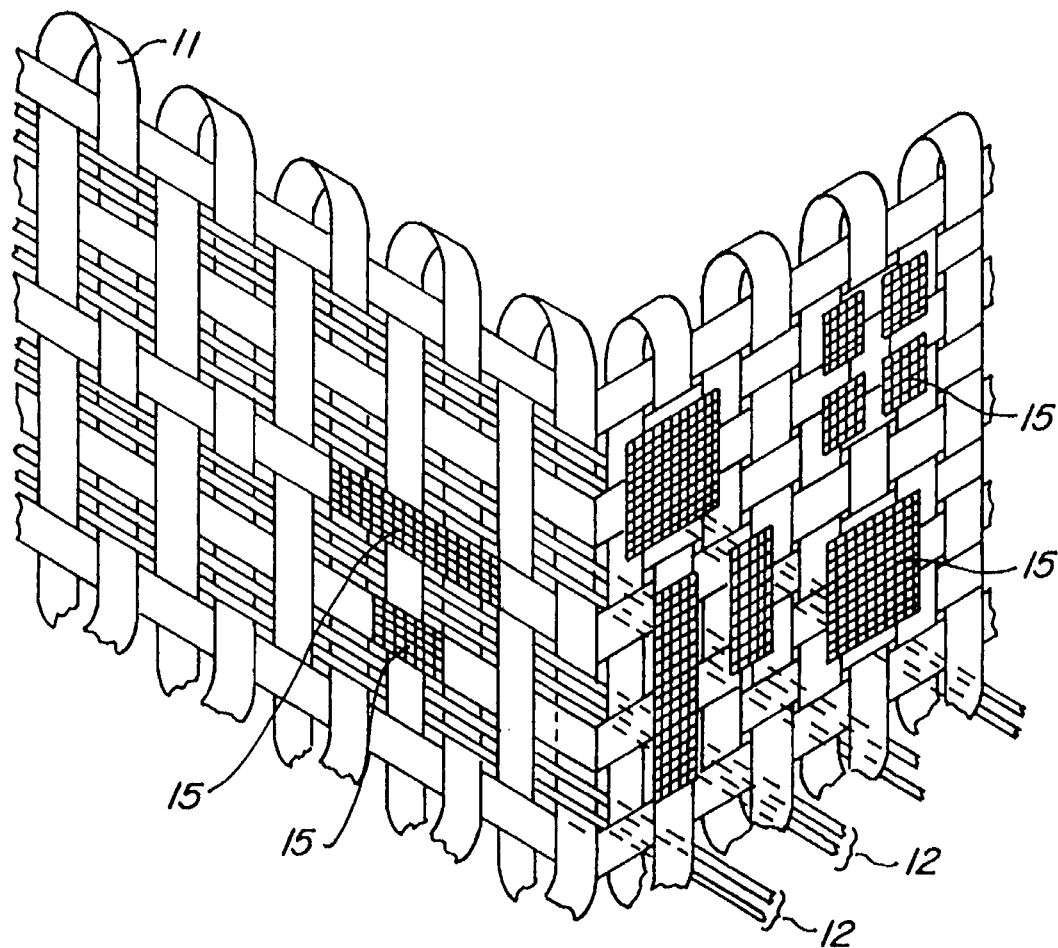
FIG. 7 illustrates another application of the invention in which the optical fibers extend beyond the structure to permit easier interconnection.

FIG. 7 is a perspective view illustrating how the structure shown in FIGS. 1, 2 and 3 may be fabricated into a three-dimensional structure. For the structure depicted in FIG. 7, the optical fibers 12 extend beyond one edge of the woven structure to facilitate optical connections. As also shown in FIG. 7, the woof fibers 11 are woven through the structure in a continuous fashion. By extending the structure beyond the area where the optical fibers are woven into the mat, an additional area of supporting material provides a structure for mounting other components 15. Of course, components 15 may also be mounted proximate to the optical fibers to enable connections at that location as well. Components 15 will typically comprise electronic, optical, or opto-electronic components. As one example, an optical detector integrated circuit can be mounted on the woven cloth mat or in the interconnect (connector), and appropriate connections made to surrounding integrated circuits using wire bonding, flexible printed circuit connections, or other well known techniques such as point-to-point contact. Of course, circuits can be mounted on either or both sides of the structure as well as out of the plane of the structure to facilitate the insertion of opto-electronic modules.

Before or after mounting the circuits, depending upon the particular application, the structure shown in FIG. 7 can be coated with an appropriate material to hold it in a rigid position or to allow it to flex.

As shown in FIG. 7, the invention provides a structure which facilitates various packaging techniques for circuits. With the structure depicted, the optical fibers are held in a precise location facilitating connection to other integrated circuits or other optical elements. Similarly, by extending the woven structure beyond the circuit substrate portion, a convenient, inexpensive, integrated technique for mounting circuit elements for connection to the optical fibers is provided. Of course, sensors may be connected to individual fibers or groups of fibers to provide large arrays of sensors.

In addition, the optical fibers themselves can be used as sensing elements to provide a smart skin array. Examples of such applications of "smart" skin arrays are described in the two technical papers referred to above. The "smart" skin can provide fiber optic sensing arrays in the skin of airplanes. It can also be used to fabricate low cost, high speed communications for computer networks. For example, the structure can be employed as an opto-electronic backplane for large scale, high performance computer systems, such as parallel processors.

The invention also provides a structure for transmission and reception of laser-generated optical signals in conjunction with packaging and interconnecting components. Such embodiments can be used to provide high speed data buses or channels to interconnect components in a high performance computer system. The use of large numbers of optical fibers facilitates construction of systems wherein redundant means for transmission of information is desired as well as for multi-channel and/or parallel information transfers.

In one embodiment, selected fibers in the warp direction may comprise electrical conductors. These conductors may replace or be in addition to the non-fiber optic supporting strands in the warp direction. Alternatively, just as with the optical fibers, electrical conductors may be positioned in the channels formed by the supporting warp strands. These configurations allow electrical power and control signals for arrays of optical detectors and sources to be provided along with optical signals over optical backplanes and interconnect cables formed according to the invention. For example, synchronized clocking signals, fiber optic array addresses, and data and power signals between optical and opto-electronic links may be transmitted via the structure of the present invention. In contrast, previous systems required separate interconnect assemblies for such electronic signals. An important consequence of this is that, for the first time, the signal translation points, i.e., the arrays of detectors and sources, may be incorporated as part of the optical interconnect assembly. That is, the arrays of devices which translate electrical signals to optical signals (e.g., sources) and the arrays of devices which translate optical signals to electrical signals (e.g., detectors) may be incorporated into connectors which are coupled to an optical interconnect assembly (e.g., a ribbon cable or optical backplane) constructed according to the present invention. The automated repeatability of the fiber optic matrix provides this capability at low cost.

These "active interconnects" minimize or completely eliminate the need for placing opto-electronic translation points external to the interconnect assembly, thereby simplifying and reducing the cost of the entire system. Other array-based elements may also be included in the connectors of these active interconnects. For example, switching, addressing, and gating elements, as well as devices for clock recovery may be incorporated into the active interconnect. The use of common power and ground lines which are coupled together via the electrical conductors in the woven structure also reduces the effects of undesirable ground loops which were a consequence of previous interconnection techniques.

Improved system electromagnetic interference (EMI) performance may also be realized according to the above-described embodiment of the present invention. In high speed electronic systems, EMI coupling occurs between transmission lines carrying electrical signals. The closer such lines are together, and the greater the distance over which they run closely parallel, the greater the interference becomes. In the separate electronic interconnects of previous systems, improvements in EMI performance often required shielding and/or spacing between electrical conductors, thereby increasing the size of these additional interconnects. In contrast, because of the easily repeated and customized spacing of warp fibers which characterizes the present invention, the electrical conductors may be positioned in the structure such that the optical fibers, which are resistant to EMI, serve, in effect, as EMI shields. Different spacings between electrical conductors may also be maintained to further reduce EMI.

The present invention significantly reduces the volume required for the optical interconnects of previous systems. For example, in previous high performance systems, a typical optical interconnect assembly connector had approximately four interconnects per inch of connector length. For a 64-bit system, the assembly connector might typically be more than 16 inches long. The accompanying electrical interconnect assembly connectors were typically on the order of 8 inches long. In addition to the capability of combining the two types of interconnect assemblies, the structure and method of the present invention as described above, allows for a much greater density of optical fibers in the interconnect assembly, thereby allowing for a much greater density of optical interconnects for a given connector length.

Figure 8:
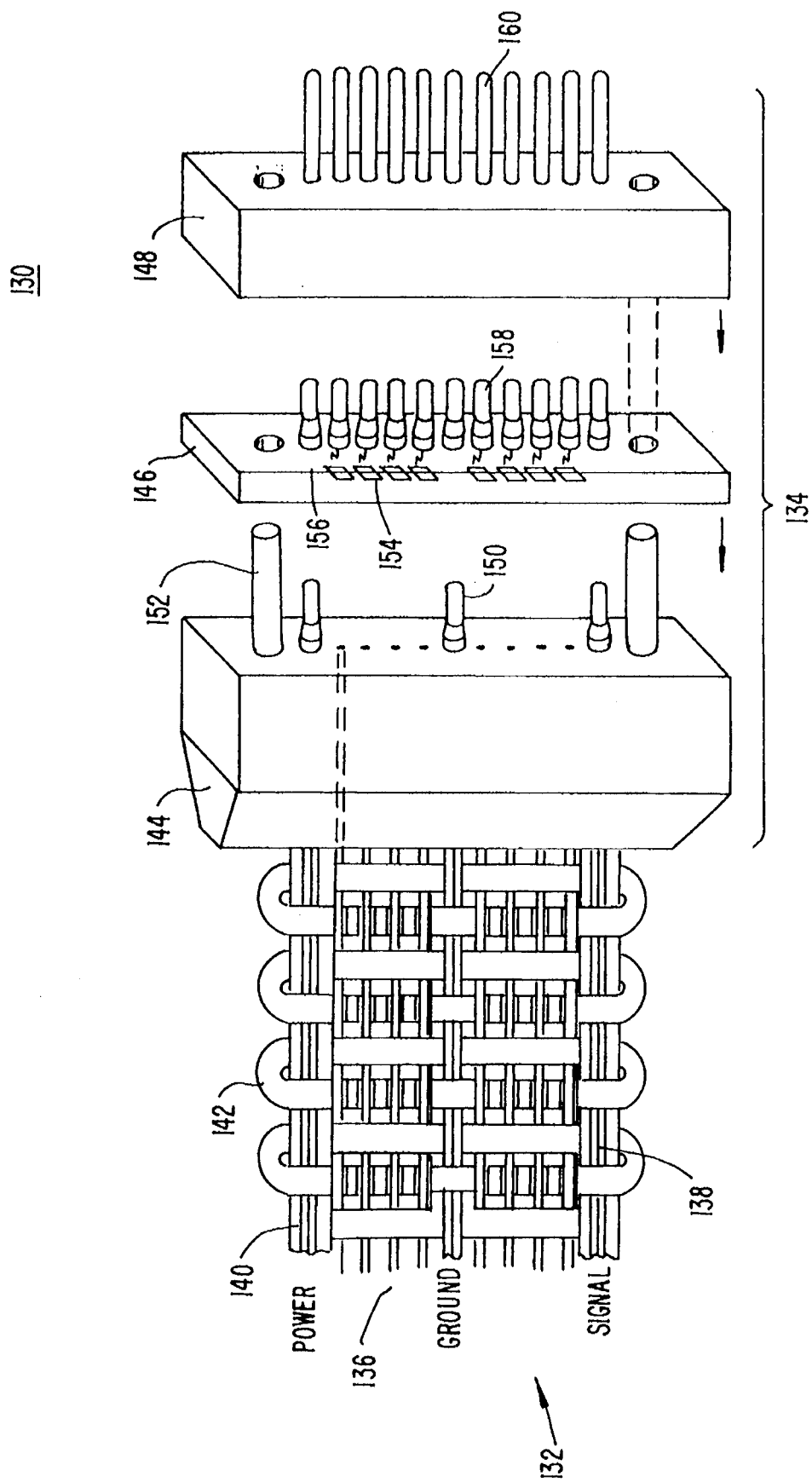
FIG. 8 illustrates part of an interconnect assembly designed according to a particular embodiment of the invention.

FIG. 8 illustrates part of an active interconnect assembly 130 designed according to one embodiment of the present invention. Interconnect 130 includes woven structure 132 and connector 134. As described above, both optical fibers 136 and electrical conductors 138 are positioned in channels formed by supporting fibers 140, the structure being completed by woof strands 142. Connector 134 comprises three sections 144, 146, and 148. Optical fibers 136 feed through section 144 while conductors 138 are coupled to electrical contacts 150. Section 146 mates with section 144 with the help of guide pins 152, section 146 having an array of opto-electronic translation devices 154 and electrical feed-throughs 156. Section 146 mates with section 148, also with the help of guide pins 152. Pins 158 on section 146 connect with pins 160 on section 148. If connector sections 146 and 148 are omitted, section 144 is a passive connector with optical fibers and electrical contacts. Passive connectors may also comprise only optical fibers, i.e., no electrical contacts. If only one section contains electrical contacts, the active part of the interconnect is single-ended.

Figure 9A:
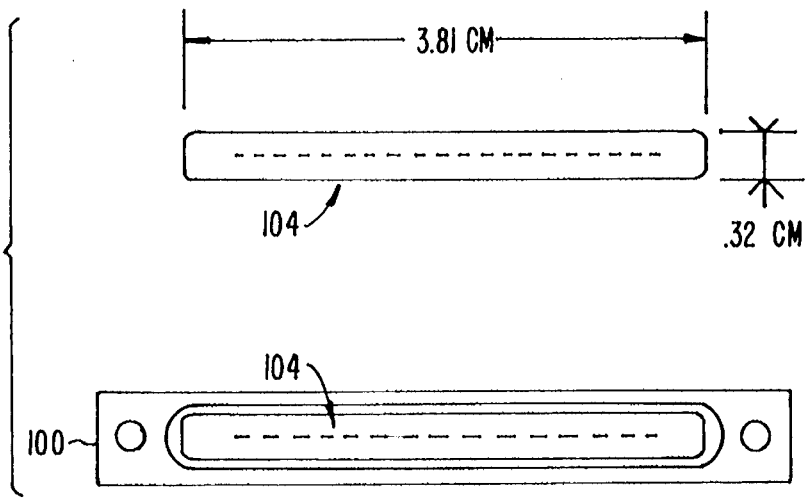
FIGS. 9A–9C illustrate a connector to which an optical fiber ribbon constructed according to the present invention is coupled.
Figure 9B:
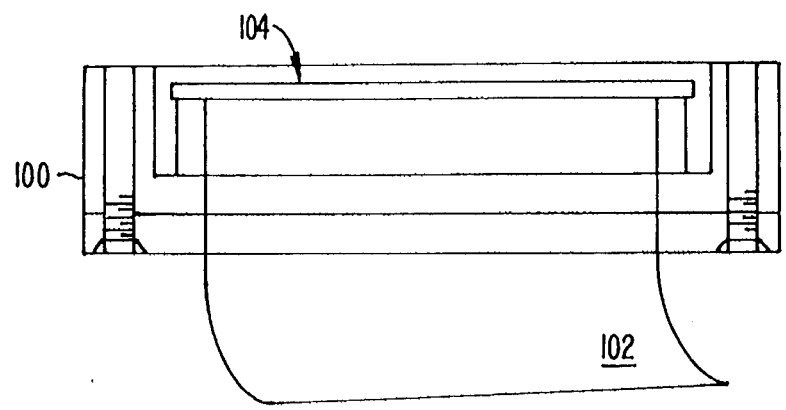
Figure 9C:
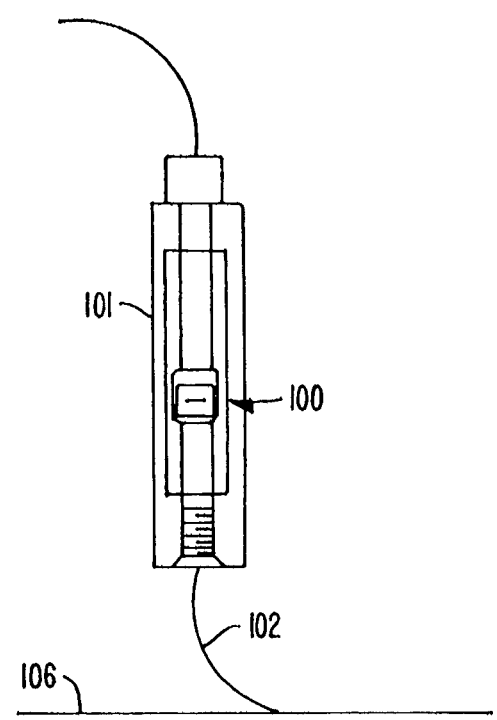

FIGS. 9A–9C depict a connector 100 to which an optical fiber ribbon 102 constructed according to the present invention is coupled. Connector 100 has 52 optical interconnects in the space of 3.81 cm (the length of ceramic plate 104). This translates to nearly 35 optical interconnects per inch. The addition of electrical conductors in the interconnect assembly necessitates an increase in the length of connector 100 which is dependent upon the size of the conductors, and is typically around 12 mils per conductor.

The active interconnect capability made possible by the incorporation of electrical conductors into the optical interconnect of the present invention results in several advantages. First, by placing signal translation elements in the interconnect hardware, the complexity of the board assemblies connected by the interconnect hardware is correspondingly reduced. Second, by removing the opto-electronic translation modules from system board assemblies, more control over system power dissipation may be exercised. This is because the heat transfer characteristics of the interconnect assembly which now houses the translation modules is more readily controllable than the board environment of previous systems. For example, a packaging material having appropriate thermal characteristics and a package shape may be chosen for the interconnect assembly to tailor the heat transfer characteristics of the assembly to fit the power dissipation requirements of the intended application.

Third, system partitioning is simplified because the interface at the board level may now be either entirely optical or entirely electronic. Finally, the multiplexing and demultiplexing of optical signals through a limited number of high speed fibers which was required in previous interconnects becomes unnecessary because of the point to point transmission made possible by the high optical fiber density of the present invention. As a result, systems incorporating the present invention may operate at speeds limited only by the optical fibers themselves and the number of optical fibers in use. It will be understood that the types of opto-electronic arrays in use at either end of the optical fibers also impact speed.

The flexibility of the woven structure of the present invention reduces the need for optical switching devices and such optical elements as mirrors and prisms, thereby further simplifying opto-electronic systems. The structure's flexibility also facilitates interconnect capability in a direction out of the plane formed by the woven structure. FIG. 9C illustrates how, for example, an optical backplane 106 may be coupled to connector 100 via ribbon 102 for such a connection. An opto-electronic module, for example, may be inserted at this connection point. FIG. 9C is a side view of connector 100 mated with a connector 101. With the application of an appropriate bend technique to the woven structure of the invention, a new type of optical backplane connection is thus made possible. One type of bend technique which may be employed to control the bend radius of the optical fibers involves the use of an elastomer coating, the thickness of which may be varied over the structure to provide the desired degree of control for particular segments of the structure. This technique may be used independently, or in combination with other bend control techniques such as those discussed below.

Figure 10A:
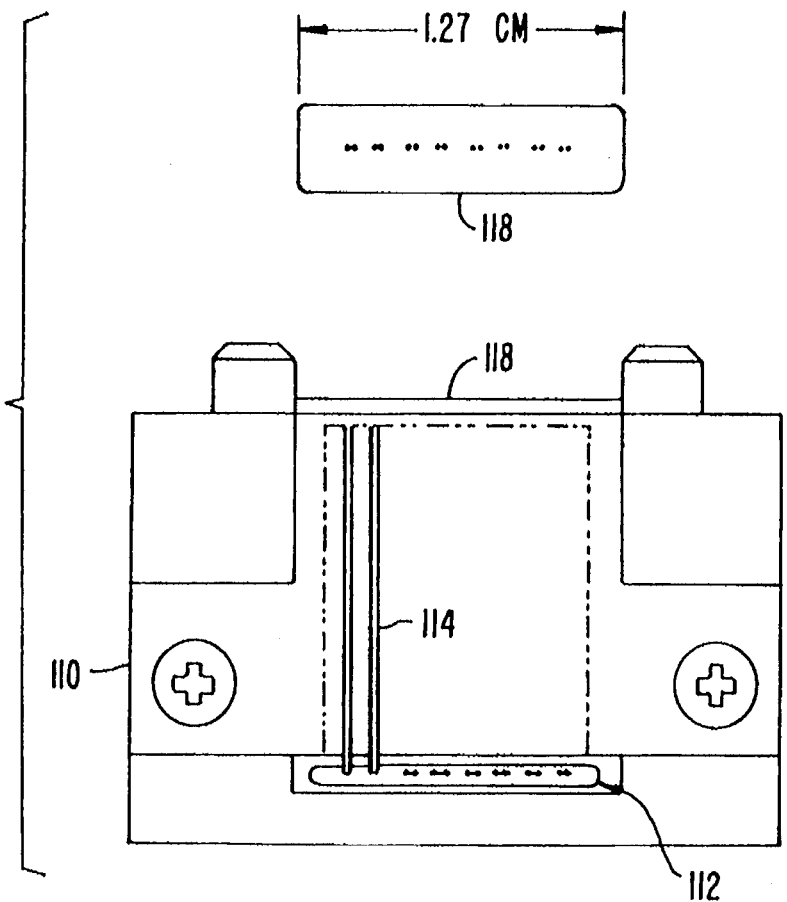
FIGS. 10A and 10B illustrate a connector in which a connection out of the plane formed by the optical backplane may be achieved employing a chamfer structure.
Figure 10B:
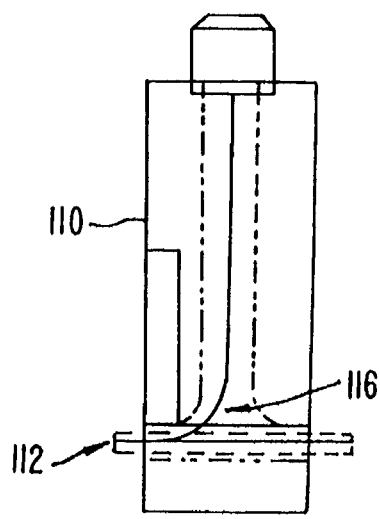

FIGS. 10A and 10B depict a connector 110 in which a connection out of the plane of backplane 112 formed according to the invention may be achieved without the danger of optical discontinuities in the optical fibers 114. Internal control of the optical fiber bend radius is accomplished by means of a chamfer structure 116 inside connector assembly 110. A top view of ceramic plate 118 is also shown. The elastomer coating described above may be employed in addition to the chamfer structure to provide an additional degree of control of the fiber bend radius.

Figure 11A:
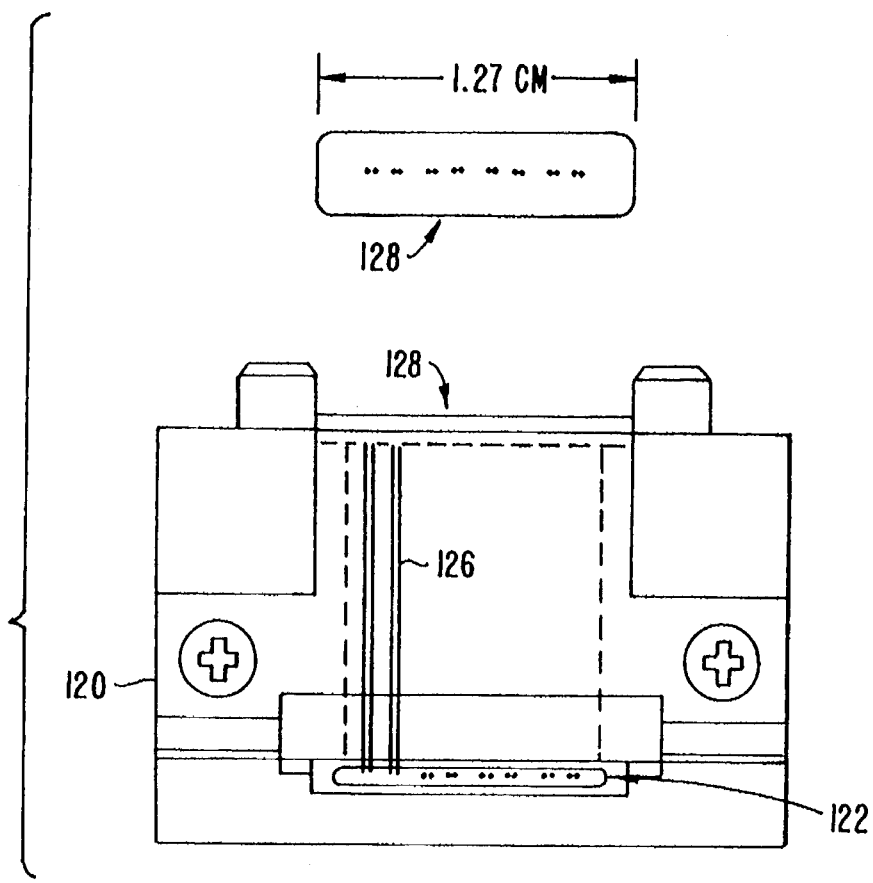
FIGS. 11A and 11B illustrate a connector in which a connection out of the plane formed by the optical backplane may be achieved by means of a rod structure.
Figure 11B:
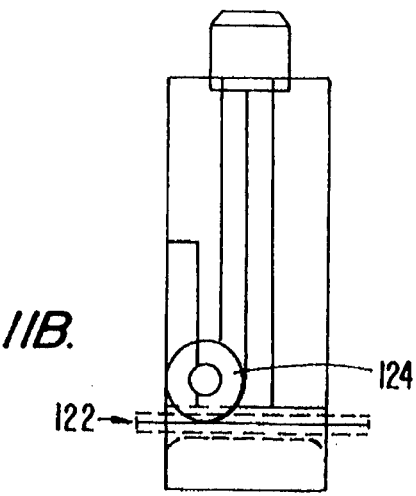

FIGS. 11A and 11B also depict a connector 120 in which a connection out of the plane of backplane 122 formed according to the invention may be achieved. Internal control of the optical fiber bend radius is accomplished by means of a rod 124 inserted during manufacture of optical backplane 122. The diameter of rod 124 is such that the actual bend radius of optical fibers 126 will be greater than or equal to the rated bend radius as specified by the manufacturer of the optical fibers, i.e., the bend radius below which scattering of light and/or unreliable operation of the optical fibers occurs. A top view of ceramic plate 128 is also shown. The elastomer coating described above may be employed in addition to the rod structure to provide an additional degree of control of the fiber bend radius.

In addition to its use in linear arrays and interconnects, the woven fiber optic structure provided by the present invention may be employed in two-dimensional interconnects, also known as X-Y arrays. FIGS. 12A–12C are different views of one embodiment of an X-Y array interconnect 180 designed according to this aspect of the present invention. In one embodiment, the woven structure of the invention is cut into strips 182 having a desired width 184 determining the dimension of the array (and thus the number of optical channels) in the X-direction. Strips 182 are then layered in the Y-direction having plates 186 therebetween to control the spacing in the Y-direction. In a specific embodiment, plates 186 have sections 187 machined therein to accommodate woven strips 182. Plates 186 may comprise such materials as ceramic, silicon, plastic, or metal. Plates 186 provide the structure to which a faceplate 188 may be attached which holds the optical fibers 190 in defined positions for transmission, switching, or routing of information. If rigidity is desired, plates 186 may be extended between strips 182 for any length along interconnect assembly 180. Alternatively, the entire assembly 180 may be placed in a hard epoxy.

Active interconnects, such as those described above with reference to FIG. 8, as well as passive interconnects, may be layered in the manner described. In specific embodiments, faceplate 188 may hold active devices. Metal may be used for plates 186 in the case of active interconnects in order that plates 186 may serve as heat dissipation elements. If an active interconnect is large, the ability to control spacing for heat dissipation becomes increasingly important. Silicon substrates or ceramic plates may be used for wire routing. For passive interconnects, plastic spacing material is usually sufficient.

Many strips 182 may be layered, allowing for a large number of channels in a relatively small space. In a more specific embodiment, each of strips 182 may be coated with an elastomer or other material (e.g., rubber epoxy) providing both stress relief and protection to the optical fibers 190 as discussed above with regard to elastomer coating of one-dimensional interconnects. The thickness of such an elastomer coating may further be varied to provide the spacing between strips in place of, or in addition to plates 186 described above. Each strip 182 may be sheathed. The entire assembly 180 may also be sheathed with the optical fibers 190 extending therefrom.

In another embodiment, instead of employing separate strips 182 of woven structure as described above, an X-Y array interconnect may be constructed by repeatedly folding the woven structure of the invention back on itself in an accordion-like fashion. The folds are made along the warp direction of the structure. In such an embodiment, the number of woof strands holding the structure together between the strips is kept to a minimum, i.e., approximately 2 to 4 strands per inch. This enables the woof strands to hold the structure together without inhibiting the folding of the structure as described, thus enabling ease of assembly. Spacing between layers may be provided as described above.

In a specific embodiment, faceplate 188 may have microlenses 192 attached to optical fibers 190 on the surface of faceplate 188. Index matching fluid, and/or anti-reflective coating may be applied to microlenses 192 and/or optical fibers 190. Microlenses 192 would serve to alleviate alignment problems where a large number of channels in a small space are desirable, such as imaging, large-scale switching, optical information management for large systems, and other such applications. Alternatively, faceplate 188 could contain ball lenses. Facilitating alignment through the use of lenses may be done with the one-dimensional linear array interconnects as well as with the two-dimensional X-Y array interconnects.

While the invention has been particularly shown and described with reference to specific embodiments thereof, it will be understood by those skilled in the art that the foregoing and other changes in the form and details may be made therein without departing from the spirit or scope of the invention. The scope of the invention, therefore, should be limited only by the following claims.

What is claimed is:

1. A woven structure comprising:
    a plurality of first strands positioned substantially parallel to each other in a warp direction, selected first strands comprising electrical conductors;
    a plurality of second strands positioned in a woof direction, the second strands being woven with the first strands; and
    a plurality of optical fibers positioned in channels defined by selected ones of the first strands, the optical fibers being supported in the structure by the first and second strands and being substantially straight and parallel to each other.

2. The woven structure of claim 1 wherein the electrical conductors and optical fibers are coated with an elastomer.

3. The woven structure of claim 2 wherein the optical fibers have an actual bend radius corresponding to the thickness of the elastomer, the actual bend radius facilitating interconnect capability in a direction out of a plane formed by the woven structure.

4. The woven structure of claim 1 further comprising a connector, the connector comprising:
    a plurality of openings for accommodating the optical fibers; and
    a plurality of electrical contacts coupled to the electrical conductors.

5. The woven structure of claim 4 wherein the optical fibers have an actual bend radius and a rated bend radius specified by a manufacturer of the optical fibers, and the connector further comprises a chamfer structure for controlling the actual bend radius of the optical fibers to be greater than the rated bend radius, the rated bend radius being a bend radius below which light scattering occurs and operation of the optical fibers becomes unreliable.

6. The woven structure of claim 5 wherein the electrical conductors and optical fibers are coated with an elastomer having varying thickness, thereby providing further control of the actual bend radius.

7. The woven structure of claim 4 wherein the optical fibers have an actual bend radius and a rated bend radius specified by a manufacturer of the optical fibers, and the connector further comprises a rod for controlling the actual bend radius of the optical fibers to be greater than the rated bend radius, the rated bend radius being a bend radius below which light scattering occurs and operation of the optical fibers becomes unreliable.

8. The woven structure of claim 7 wherein the electrical conductors and optical fibers are coated with an elastomer having varying thickness, thereby providing further control of the actual bend radius.

9. The woven structure of claim 1 further comprising a connector, the connector comprising:
    a plurality of openings for accommodating the optical fibers;
    a plurality of electrical contacts coupled to the electrical conductors; and
    a plurality of opto-electronic devices coupled to the electrical contacts and optical fibers to facilitate signal translation.

10. A woven structure comprising:

a plurality of first strands positioned substantially parallel to each other in a warp direction, selected first strands comprising electrical conductors;

a plurality of second strands positioned in a woof direction, the second strands being woven with the first strands;

a plurality of optical fibers positioned in channels defined by selected ones of the first strands, the optical fibers being supported in the structure by the first and second strands and being substantially straight and parallel to each other; and a connector having:

a plurality of openings for accommodating the optical fibers;

a plurality of electrical contacts coupled to the electrical conductors; and a plurality of opto-electronic devices coupled to the electrical contacts and optical fibers to facilitate signal translation.

11. A woven structure comprising:

a plurality of first strands positioned substantially parallel to each other in a warp direction;

a plurality of second strands positioned in a woof direction, the second strands being woven with the first strands;

a plurality of optical fibers positioned in channels defined by selected ones of the first strands, the optical fibers being supported in the structure by the first and second strands and being substantially straight and parallel to each other; and a connector coupled to the woven structure having a plurality of openings for accommodating the optical fibers.

12. The woven structure of claim 11 wherein the optical fibers are coated with an elastomer.

13. The woven structure of claim 12 wherein the optical fibers have an actual bend radius corresponding to the thickness of the elastomer, the actual bend radius facilitating interconnect capability in a direction out of a plane formed by the woven structure.

14. A woven structure comprising:

a plurality of first strands positioned substantially parallel to each other in a warp direction;

a plurality of second strands positioned in a woof direction, the second strands being woven with the first strands;

a plurality of optical fibers positioned in first channels defined by selected ones of the first strands, the optical fibers being supported in the structure by the first and second strands and being substantially straight and parallel to each other; and a plurality of electrical conductors positioned in second channels defined by selected ones of the first strands.

15. The woven structure of claim 14 wherein the electrical conductors and optical fibers are coated with an elastomer.

16. The woven structure of claim 15 wherein the optical fibers have an actual bend radius corresponding to the thickness of the elastomer, the actual bend radius facilitating interconnect capability in a direction out of a plane formed by the woven structure.

17. The woven structure of claim 14 further comprising a connector, the connector comprising:

a plurality of openings for accommodating the optical fibers; and a plurality of electrical contacts coupled to the electrical conductors.

18. The woven structure of claim 17 wherein the optical fibers have an actual bend radius and a rated bend radius specified by a manufacturer of the optical fibers, and the connector further comprises a chamfer structure for controlling the actual bend radius of the optical fibers to be greater than the rated bend radius, the rated bend radius being a bend radius below which light scattering occurs and operation of the optical fibers becomes unreliable.

19. The woven structure of claim 18 wherein the electrical conductors and optical fibers are coated with an elastomer having varying thickness, thereby providing further control of the actual bend radius.

20. The woven structure of claim 17 wherein the optical fibers have an actual bend radius and a rated bend radius specified by a manufacturer of the optical fibers, and the connector further comprises a rod for controlling the actual bend radius of the optical fibers to be greater than the rated bend radius, the rated bend radius being a bend radius below which light scattering occurs and operation of the optical fibers becomes unreliable.

21. The woven structure of claim 20 wherein the electrical conductors and optical fibers are coated with an elastomer having varying thickness, thereby providing further control of the actual bend radius.

22. The woven structure of claim 14 further comprising a connector, the connector comprising:

a plurality of openings for accommodating the optical fibers;

a plurality of electrical contacts coupled to the electrical conductors; and a plurality of opto-electronic devices coupled to the electrical contacts and optical fibers to facilitate signal translation.

23. The woven structure of claim 1 wherein:

adjoining pairs of the first strands define channels in the structure; and at least one optical fiber is positioned in each channel.

24. The woven structure of claim 23 wherein:

a pair of optical fibers is positioned in each channel.

25. The woven structure of claim 1 wherein the woven structure has an upper and a lower surface, and further comprising:

a coating of encapsulation material disposed over both the upper and lower surfaces to secure the strands and the optical fibers in place.

26. The woven structure of claim 25 wherein the encapsulation material forms a rigid structure.

27. The woven structure of claim 26 wherein the encapsulation material comprises an epoxy.

28. The woven structure of claim 25 wherein the encapsulation material forms a flexible structure.

29. The woven structure of claim 28 wherein the encapsulation material comprises a form of rubberized cement.

30. The woven structure of claim 1 further comprising a leno disposed along at least one edge of the structure to prevent unraveling of that edge.

31. A two dimensional array interconnect assembly, comprising:

a plurality of woven strips arranged in layers, each woven strip comprising:

a plurality of first strands positioned substantially parallel to each other in a warp direction in each of the strips;

a plurality of second strands positioned in a woof direction in each of the strips, the second strands being woven with the first strands; and a plurality of optical fibers positioned in channels in each of the strips, the channels being defined by selected ones of the first strands, the optical fibers being supported in the strips by the first and second strands and being substantially straight and parallel to each other within each strip;

a plurality of spacing plates for providing spacing between adjacent strips; and a faceplate coupled to the spacing plates and the optical fibers.

32. A two dimensional array interconnect assembly, comprising:

at least one woven structure, said at least one woven structure comprising:

a plurality of first strands positioned substantially parallel to each other in a warp direction;

a plurality of second strands positioned in a woof direction, the second strands being woven with the first strands; and a plurality of optical fibers positioned in channels defined by selected ones of the first strands, the optical fibers being supported in the structure by the first and second strands and being substantially straight and parallel to each other;

said at least one woven structure having a plurality of folds in parallel with the optical fibers, thereby forming a plurality of layers;

a plurality of spacing plates for providing spacing between adjacent layers in the woven structure; and a faceplate coupled to the spacing plates and the optical fibers.

* * * * *